May 3, 1927.
C. C. FARMER
1,626,673
FLEXIBLE DIAPHRAGM DEVICE
Filed Oct. 17, 1924
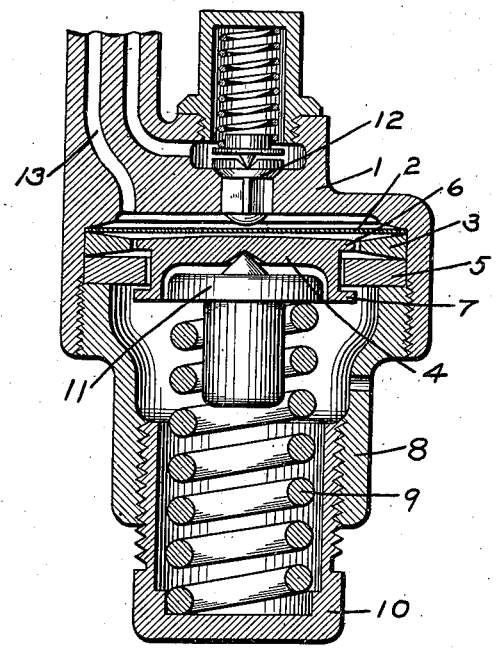
INVENTOR
CLYDE C. FARMER
BY *Wm. M. Cady*
ATTORNEY Patented May 3, 1927.

1,626,673

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

FLEXIBLE DIAPHRAGM DEVICE.

Application filed October 17, 1924. Serial No. 744,178.

This invention relates to flexible diaphragm devices and more particularly to diaphragms which are subject to the opposing pressures of a regulating spring and fluid pressure, such as the regulating portion of the well known feed valve used in railway locomotive equipment.

It has been found in assembling and practical operation of diaphragm devices, that the diaphragm is liable to become disrupted by excessive pressure acting on one side or the other of the diaphragm, at a time when the pressure on the opposite side is wholly relieved in assembling or disassembling, and under conditions in operation, as for example, when the fluid pressure in the system is entirely depleted and there is thus no opposing pressure to that of the spring.

The principal object of this invention is to provide means for preventing the possible disruption of the diaphragm under the above mentioned circumstances.

In the accompanying drawing, the single figure is a central vertical section of a diaphragm device embodying my invention.

My invention is shown in the drawing as applied to a diaphragm device such as employed in the regulating portion of the well known feed valve device, comprising a casing 1 containing a flexible diaphragm 2 which is clamped in place by the usual diaphragm ring 3.

According to my invention a diaphragm follower 4 is provided, which in connection with a stop ring 5, is adapted to limit the movement of the diaphragm. The follower 4 is provided with flanges 6 and 7 having an intermediate groove and the stop ring 5 fits loosely in said groove.

The stop ring 5 is preferably made in two parts to facilitate the assembling of the device. The regulating spring box 8, which holds the stop ring in place against the diaphragm ring 3, contains the regulating spring 9, the same being held in said box under different degrees of compression according to the position of the adjusting nut 10. As will now be seen, the diaphragm 2 is adapted to be engaged on one side by the diaphragm follower 4, which by reason of its contact with spring seat 11, exerts regulating spring pressure on the under side of said diaphragm. On the other side, the diaphragm is adapted to engage the stem of poppet valve 12.

In the normal operation, when the fluid pressure, supplied through passage 13 to the diaphragm 2, exceeds the pressure at which the spring 9 may be adjusted, the diaphragm is deflected downwardly, permitting the valve 12 to seat. When the fluid pressure supplied to the diaphragm is reduced below the pressure of the spring 9, the diaphragm will be moved upwardly to unseat the valve 12.

If, however, for any reason, there should be no fluid pressure acting on the diaphragm, the spring 9 is prevented from exerting an excessive pressure on the diaphragm, such as might rupture the same, due to the engagement of the flange 7 with the ring 5, after a limited upward movement of the follower 4. In a similar way, if the pressure of the spring 9 should be entirely removed as when the regulating portion is disassembled and there is fluid pressure still acting on the opposite face of the diaphragm, the engagement of the upper flange 6 with the ring 5 after a limited downward movement of the diaphragm will prevent excessive movement of the diaphragm and consequent possible rupture thereof.

Having now described my invention, what I claim as new and desire to secure by Letters Patent, is:—

1. The combination with a flexible diaphragm, of a follower engaging said diaphragm and provided with an annular groove and a stop ring in said groove and adapted to limit the movement of said follower and thereby the movement by said follower of said diaphragm in either direction.

2. The combination with a flexible diaphragm, of a follower engaging said diaphragm and provided with flanges forming an intermediate annular groove and a stop ring in said groove and engageable by one of said flanges to limit the movement of said follower and thereby the movement of said diaphragm by said follower in either direction.

3. The combination with a casing and a flexible diaphragm mounted in said casing and subject on one side to fluid under pressure, of a follower engaging the other side of said diaphragm and provided with flanges forming an intermediate annular groove, a spring acting on said follower, and a stop ring mounted in said casing and extending into said groove to limit the movement of said follower.

In testimony whereof I have hereunto set my hand.

CLYDE C. FARMER.